United States Patent

Pettini et al.

Patent Number: 5,688,316
Date of Patent: Nov. 18, 1997

[54] PIGMENTED SUBSTRATES COMPRISING TERBIUM COMPOUND COLORANTS

[75] Inventors: Fabienne Pettini, Paris; Thierry Seguelong, Puteaux, both of France

[73] Assignee: Rhone-Poulenc Chimie, Courbevoie Cedex, France

[21] Appl. No.: 618,562

[22] Filed: Mar. 20, 1996

[30] Foreign Application Priority Data

Mar. 28, 1995 [FR] France .................................. 95 03600

[51] Int. Cl.$^6$ ............................. C09C 1/00; C09C 1/02
[52] U.S. Cl. ................. 106/461; 106/401; 106/450; 106/451; 106/466; 106/467; 423/263; 428/403
[58] Field of Search ........................ 106/401, 450, 106/451, 461, 466, 467; 428/403; 423/263

[56] References Cited

U.S. PATENT DOCUMENTS

| 5,401,309 | 3/1995 | Chopin et al. | 106/461 |
| 5,560,772 | 10/1996 | Huguenin et al. | 106/451 |

FOREIGN PATENT DOCUMENTS 0654507  5/1995  European Pat. Off. .

OTHER PUBLICATIONS

Database WPI, Week 9114, Derwent Publications Ltd., London, GB; AN 91–096665 & JP-A-03 037 272, (Sumitumo Cement), Feb. 18, 1991.
Database WPI, Week 8707, Derwent Publications, Ltd., London, GB; AN 87–046178 & JP-A-62 003 04 Jan. 9, 1987.

*Primary Examiner*—Michael Marcheschi
*Attorney, Agent, or Firm*—Burns, Doane, Swecker & Mathis, L.L.P.

[57] ABSTRACT

Colored/pigmented substrates, for example plastics, paints, varnishes, ceramics, glazes, papers, inks, cosmetics, dyes, binders, coatings, rubbers, etc., include an effective coloration-imparting amount of at least one colorant terbium compound having the formula $ATbO_3$ and/or $ATbMO_3$, wherein $\underline{A}$ is at least one alkaline earth metal and $\underline{M}$ is cerium, zirconium, praseodymium, or combination thereof.

14 Claims, No Drawings

PIGMENTED SUBSTRATES COMPRISING TERBIUM COMPOUND COLORANTS

BACKGROUND OF THE INVENTION

1. Technical Field of the Invention

The present invention relates to the coloration/pigmentation of a wide variety of substrates by formulating therein or thereon certain terbium-based compounds.

2. Description of the Prior Art

Inorganic colorants/pigments are today widely employed in many industries, especially in the paint, plastics and ceramics industries. For such applications, properties such as, inter alia, thermal and/or chemical stability, dispersibility (ability of the product to disperse properly in a given medium), compatibility with the medium to be colored, intrinsic color, tinting power and hiding power constitute particularly important criteria that must be considered in the selection of a suitable pigment/colorant.

Unfortunately, most of the inorganic pigments that are suitable for applications such as those indicated above and that are today actually employed on an industrial scale typically comprise metals (especially cadmium, lead, chromium and cobalt), the use of which is becoming increasingly strictly regulated, or even prohibited, by law or regulation in a number of countries. This is because of their reputedly very high toxicity. Particularly representative thereof are the yellow pigments of the lead chromate or antimonate type.

Consequently, serious need continues to exist in this art for substitute inorganic pigments/colorants that do not present, among others, the aforesaid disadvantage of high toxicity.

SUMMARY OF THE INVENTION

Accordingly, a major object of the present invention is the provision of an improved pigment/colorant for a wide variety of useful substrates that is conspicuously devoid of the above disadvantages and drawbacks to date characterizing the state of this art.

Briefly, the present invention features characteristically yellow terbium colorant compounds having the formula $ATbO_3$, in which A is at least one alkaline earth metal, for the coloration of diverse substrates.

This invention also features colorant compositions comprising particulates of a compound of said formula $ATbO_3$ coated with a sheathing layer of at least one transparent oxide.

DETAILED DESCRIPTION OF BEST MODE AND PREFERRED EMBODIMENTS OF THE INVENTION

More particularly according to the present invention, as indicated above, the subject terbium compounds have the formula $ATbO_3$ in which A is an alkaline earth metal. Preferably, A is barium or strontium.

By the term "composition (or substrate) comprising a compound of formula $ATbO_3$" are intended compositions including only the compound of formula $ATbO_3$ or comprising this compound together with other compounds.

In an alternative embodiment of the invention, the terbium is present with another element M, especially in the $ATbO_3$ compound itself and being partially replaced by this element M, with M being selected from among cerium, zirconium and praseodymium.

The proportions of terbium to the other element M may be of any value and are established as a function of the desired coloration. For example, the proportion of other element M/other element M+terbium, in atom %, may range at least up to 95%.

In those instances where the content of element M is high, it is possible for the composition to constitute a mixture of two phases of the $ATbO_3$ and $AMO_3$ type, it also being possible for each of Tb and M in each of these phases to be partially replaced by the other element.

Compounds having a particle size (mean particle size) of at most 5 µm, and more particularly of at most 1, are the preferred.

The present invention also features colorant compositions comprising particulates (e.g., a powder, beads, etc.) of a compound of said formula $ATbO_3$ coated with a sheathing layer of at least one transparent oxide.

These coated particulates present the advantage of exhibiting improved thermostability and improved chemical stability in media such as water (at neutral, basic or weakly acidic pH) and organic solvents.

By "transparent oxide" is intended an oxide which, once deposited onto the support compound in the form of a more or less thin film (whether or not continuous), absorbs only a slight fraction or none of the photoirradiation in the visible range, and in such manner as not, or only slightly, to mask the original intrinsic color of the support. Further, the term "oxide," which is employed herein for convenience, includes the hydrates thereof.

These oxides or hydrated oxides may be amorphous and/or crystalline.

The transparent oxides are preferably selected from among silica, alumina, zirconia, zircon, titanium oxide, rare earth oxides, and mixtures thereof.

By "rare earths" are intended the elements of the Periodic Table having an atomic number ranging from 57 to 71, inclusive, as well as yttrium, which has an atomic number of 39, reference thereto being The Periodic Table of the elements as published in the Supplement to the Bulletin de la Société Chimique de France, No. 1 (January 1966).

It should be appreciated that the peripheral layer coating the support composition or compound need not be completely continuous or homogeneous. However, preferably, the coated particulates according to the invention comprise a uniform coating layer of controlled thickness of transparent oxide, such that the original color of the support is not altered by coating.

The particulates with an oxide sheathing layer preferably have the same particle size as that given above.

Thus, this invention also features the coloration/pigmentation of a wide variety of substrates by means of the coated particulates described above.

The compounds of formula $ATbO_3$ conveniently are prepared by solid-state firing at a temperature on the order of 1,400° C. The starting materials, which are employed in the stoichiometric proportions required, are oxides such as, for example, $CeO_2$, $ZrO_2$, $Tb_4O_7$ or $Pr_6O_{11}$. It is also possible to employ the carbonates or nitrates. After calcination, the products obtained may be milled. It should be appreciated that the compounds of formula $ATbO_3$ can be very easily disintegrated, if need be, to attain the aforementioned particle size. This disintegration can be carried out via gentle milling, for example by air jet milling.

For the preparation of the coated particulates, the support particles of formula $ATbO_3$ are contacted with a precursor of the oxide to form a layer and the oxide is then precipitated thereon. Processes for the precipitation of the oxides and the precursors thereof are per se known to this art.

In the case of silica, it can be prepared by hydrolysis of an alkyl silicate. This is carried out by forming a reaction mixture by mixing water, alcohol, some support which is then suspended, and optionally a base, and by then introducing the alkyl silicate. It can also be prepared by reacting the support, a silicate of alkali metal type, and an acid.

In the case of an alumina-based layer, the support, an aluminate and an acid may be reacted, whereupon alumina is precipitated. This precipitation may also be attained by contacting the support with an aluminum salt and a base and interreacting same.

Also, the alumina can be formed by hydrolysis of an aluminum alcoholate.

As regards titanium dioxide, this can be precipitated by introducing, on the one hand, a titanium salt such as $TiCl_4$, $TiOCl_2$ or $TiOSO_4$ and, on the other, a base, into an aqueous suspension of the support. The operation can also be carried out by hydrolysis of an alkyl titanate.

Lastly, in the case of a layer based on zirconium oxide, a cohydrolysis can be carried out, in an aqueous suspension of the support, of, on the one hand, a zirconium alcoholate and, on the other, a silicon alcoholate, this being in the presence of sodium fluoride NaF. The pigment thus formed is recovered and then calcined to convert the precipitated coating layer into a zircon phase, the NaF then serving as a flux to assist conversion at the lowest possible temperature.

The compositions and compounds described above have a very good tinting power and a very good hiding power and, as a result, are suitable for the coloration/pigmentation of many and diverse materials such as plastics and paints.

Thus, for example, they can be employed for the coloration of plastics which may be of the thermoplastic or thermosetting type.

Exemplary thermoplastic resins well suited for coloration/pigmentation according to the invention include polyvinyl chloride, polyvinyl alcohol, polystyrene, styrene/butadiene, styrene/acrylonitrile and acrylonitrile/butadiene/styrene (ABS) copolymers, acrylic polymers, especially polymethyl methacrylate, polyolefins such as polyethylene, polypropylene, polybutene, polymethylpentene and cellulose derivatives such as, for example, cellulose acetate, cellulose acetobutyrate, ethyl cellulose and polyamides. The subject compounds/compositions are very particularly well suited for the coloration of polyvinyl chloride, polypropylene and ABS.

Exemplary thermosetting resins well suited for coloration/pigmentation according to the invention include phenolic plastics, aminoplastics, especially urea/formaldehyde and melamine/formaldehyde copolymers, epoxy resins and heat-curable polyesters.

The subject compounds/compositions are also useful for the coloration of special polymers, such as fluoropolymers, in particular polytetrafluoroethylene (PTFE), polycarbonates, silicone elastomers, polyimides, saturated polyesters such as PET and PBT and polyacetals such as POM.

For this specific application of the coloration of plastics, the subject compounds/compositions can be used directly in powder form. They can also, preferably, be used in a predispersed form, for example as a premix with a proportion of the resin, or in the form of a paste concentrate, or of a liquid, which permits same to be introduced at any stage in the production of the resin. This latter attribute constitutes a particularly notable advantage of the subject compounds/compositions.

Thus, the subject compounds/compositions may be incorporated into plastics such as those indicated above in a proportion by weight generally ranging either from 0.01% to 5% (relative to the final product) or from 40% to 70% in the case of a concentrate.

The subject compounds/compositions may also be employed in the field of paints and varnishes and, more particularly, in the following resins: alkyd resins, the most typical of which being glycerophthalic, resins modified with tall or short oil, acrylic resins prepared from esters (methyl or ethyl) of acrylic and methacrylic acid, optionally copolymerized with ethyl, 2-ethylhexyl or butyl acrylate, vinyl resins such as, for example, polyvinyl acetate, polyvinyl chloride, polyvinylbutyral, polyvinylformal, and vinyl chloride and vinyl acetate or vinylidene chloride copolymers, aminoplastic or phenolic resins which are typically modified, polyester resins, polyurethane resins, epoxy resins and silicone resins.

The subject compounds/compositions are generally formulated in a proportion of 5% to 30% by weight of the paint and from 0.1% to 5% by weight of the varnish.

The particulates coated with a layer of transparent oxide can be employed, more particularly, for the coloration of ceramic materials such as for example, porcelain, crockery and stoneware, this either by coloration of the ceramic throughout its volume (physical mixing of the ceramic powder with the pigment), or by coloration of only the face surface of the latter by means of glazes (coating glazing compositions) containing the pigment.

For this application, the amount of compound/composition used generally ranges from 1% to 30% by weight relative either to the total ceramic or relative to the glaze alone.

The subject compounds/compositions can also be employed for the coloration/pigmentation of an inorganic binder.

Such inorganic binders include the hydraulic binders, aerial binders, plaster and binders of the anhydrous or partially hydrated calcium sulfate type.

By "hydraulic binders" are intended substances which exhibit the property of setting and hardening after the addition of water, to form water-insoluble hydrates.

The present invention is very particularly applicable for the coloration of cements and, of course, of the concretes produced from these cements by the addition of water, sand and/or gravel thereto.

According to this invention, the cement may, for example, be of the alumina type. This comprehends any cement containing a high proportion either of alumina, as such, or of aluminate, or of both. Calcium aluminate-based cements, especially those of the Secar type, are particularly representative thereof.

The cement may also be of the silicate type and more particularly, calcium silicate-based. Exemplary thereof are the Portland cements and, within this type of cements, the fast- or very fast-setting Portlands, white cements, sulfate-resistant cements and those including blast furnace slags and/or fly ash and/or meta-kaolin.

Cements based on calcium sulfate hemihydrate and magnesia cements, known as Sorel cements, are also exemplary thereof.

This invention also features the coloration/pigmentation of aerial binders, namely, binders which harden in the ambient or open air by reason of the action of $CO_2$, of the calcium or magnesium oxide or hydroxide type.

The present invention is also applicable to the coloration of plaster and of binders of the anhydrous or partially hydrated calcium sulfate type ($CaSO_4$ and $CaSO_4.\frac{1}{2}H_2O$).

Too, the subject compounds/compositions are also well suited for applications in the rubber industry, especially in floor coverings, in the paper and printing inks industry, in the field of cosmetics and in a wide variety of other fields such as, for example, and without limitation, dyeing, leather finishing and laminated coatings for kitchens and other work surfaces.

Lastly, the present invention also features colored/pigmented substrates of the genera plastics, paints, varnishes, rubbers, ceramics, glazes, papers, inks, cosmetic products, dyes, inorganic binders and laminated coatings which include the subject compounds/compositions.

In order to further illustrate the present invention and the advantages thereof, the following specific example is given, it being understood that same is intended only as illustrative and in nowise limitative.

In said example to follow, the chromatic coordinates $L^*$, $a^*$ and $b^*$ are reported and in the remainder of the description as the CIE 1976 ($L^*$, $a^*$ and $b^*$) system as defined by the International Commission on Illumination and listed in the French Standard Compendium (AFNOR), colorimetric color No. X08-12 (1983). As regards the measurements carried out on the products and the plastics, these were determined by means of a colorimeter marketed by the Pacific Scientific Company. The nature of the illuminant was D65. The observation area was a circular disc 12.5 $cm^2$ in area. The observation conditions corresponded to viewing at an aperture angle of 10°. In the measurements given, the specular component was excluded. In the case of the measurements made on paints, the colorimeter employed was a Data Color and the illuminant was C10.

$L^*$ is a measure of the reflectance (light/dark shade) and thus varies from 100 (white) to 0 (black).

$a^*$ and $b^*$ are the values of the color trends:

positive $a^*$=red negative $a^*$=green positive $b^*$=yellow negative $b^*$=blue $L^*$ therefore represents the variation from black to white, $a^*$ the variation from green to red and $b^*$ the variation from yellow to blue.

EXAMPLE

Preparation of the subject compounds/compositions

Different compounds were prepared by solid phase reaction by mixing, in an agate crucible, the oxides $CeO_2$, $Tb_4O_7$ (marketed by Rhône-Poulenc) and carbonates $BaCO_3$ and $SrCO_3$ (marketed by Prolabo Rectapur) in the desired stoichiometric proportions. Tablets thereof were shaped at 0.5 t/$cm^2$. The material was calcined under oxygen according to a heating cycle in two stages, one of 10 hours at 1,400° C. and then the other of 5 hours at 1,000° C. The tablets obtained were disintegrated and were converted into a powder of 1 µm mean diameter. The powder was characterized by colorimetry (scattered reflection).

The colorimetric characterizations of the phases obtained are reported in Table I below:

TABLE I

| Phase | L* | a* | b* |
|---|---|---|---|
| $SrCe_{0.95}Tb_{0.05}O_3$* | 81.7 | 2.67 | 54.34 |
| $SrTbO_3$ | 80.0 | −2.33 | 75.47 |
| $BaTbO_3$ | 81.2 | 10.63 | 90.94 |

*Mixture of phases

Formulation of the subject compounds/compositions into a paint substrate

The compound $BaTbO_3$ prepared above was incorporated into a melamine alkyd paint in a proportion of 36% by weight. The paint was then cured for 30 minutes at 135° C.

The chromatic coordinates were determined for the paint as obtained above, namely, at full strength, as well as for paints which had been "diluted" with white pigment via incorporation of titanium dioxide. The results obtained are reported in Table II below.

TABLE II

| Paint | L* | a* | b* | CR |
|---|---|---|---|---|
| Full strength | 73 | 16 | 103 | |
| Cut with white 90Y/10W | 80 | 7 | 63 | |
| Cut with white 50Y/50W | 90 | 2 | 26 | 98.5 |

Y: yellow pigment according to the invention
W: titanium dioxide

The Y/W ratios are given by weight. Colorimetry at 150 µm. CR: contrast ratio black background, white background.

It should be appreciated that even with a 50% dilution with white pigment, a value of $b^*$ was still attained which was sufficiently high to give a sustained yellow color. The CR remained high, which demonstrated a good hiding power.

Formulation of the subject compounds/compositions into a plastic substrate

The compound $BaTbO_3$ prepared above was incorporated into polypropylene in a proportion of 1% by weight. Test pieces were fabricated by injection molding at 240° C. The measurement of the chromatic coordinates was carried out on a white background. The following values were obtained.

$L^*$=61.05; $a^*$=0.16; $b^*$=56.62

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a colored/pigmented substrate, the improvement which comprises, as the colorant therefor, an effective coloration-imparting amount of at least one colorant terbium compound having the formula $ATbO_3$ and/or $ATbMO_3$, wherein $\underline{A}$ is at least one alkaline earth metal and $\underline{M}$ is cerium, zirconium, praseodymium, or combination thereof.

2. The colored/pigmented substrate as defined by claim 1, further comprising a compound having the formula $AMO_3$.

3. The colored/pigmented substrate as defined by claim 1, wherein the colorant of said at least one compound having the formula $ATbO_3$ and/or $ATbMO_3$ comprises particulates.

4. The colored/pigmented substrate as defined by claim 3, wherein said particulates have a particle size no greater than 5 μm.

5. The colored/pigmented substrate as defined by claim 3, wherein said particulates include a coating layer of at least one transparent inorganic oxide.

6. The colored/pigmented substrate as defined by claim 5, wherein said at least one transparent inorganic oxide comprises silica, alumina, zirconia, zircon, titanium oxide, a rare earth oxide, or combination thereof.

7. The colored/pigmented substrate as defined by claim 6, wherein said at least one transparent inorganic oxide comprises silica.

8. The colored/pigmented substrate as defined by claim 1, having a yellow tint.

9. The colored/pigmented substrate as defined by claim 3, wherein said particulates have a particle size no greater than 1 μm.

10. The colored/pigmented substrate as defined by claim 5, said particulates comprising an essentially uniform and homogeneous coating layer of said at least one transparent inorganic oxide.

11. The colored/pigmented substrate as defined by claim 1, wherein the substrate comprises a plastic, resin, polymer, paint, varnish, ceramic, glaze, coating, binder, cement, plaster, rubber, paper, ink, cosmetic or dye.

12. The colored/pigmented substrate as defined by claim 11, wherein the substrate comprises a plastic or paint.

13. The colored/pigmented substrate as defined by claim 3, wherein said particulates are uniformly distributed through the substrate.

14. The colored/pigmented substrate as defined by claim 1, wherein in said at least one compound having the formula $ATbO_3$ and/or $ATbMO_3$, $\underline{A}$ is barium or strontium.

* * * * *